United States Patent
Evans et al.

(10) Patent No.: US 12,172,902 B2
(45) Date of Patent: Dec. 24, 2024

(54) LOW COMPRESSION SET AEROGELS AND AEROGEL COMPOSITES AND METHODS OF MAKING

(71) Applicant: Aspen Aerogels, Inc., Northborough, MA (US)

(72) Inventors: Owen Evans, Chelmsford, MA (US); George Gould, Mendon, MA (US); John Williams, Groton, MA (US); David Mihalcik, Northborough, MA (US); Kathryn deKrafft, Hudson, MA (US); Wenting Dong, Northborough, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 0 days.

(21) Appl. No.: 18/697,688

(22) PCT Filed: Dec. 16, 2022

(86) PCT No.: PCT/US2022/081835
§ 371 (c)(1),
(2) Date: Apr. 1, 2024

(87) PCT Pub. No.: WO2023/115018
PCT Pub. Date: Jun. 22, 2023

(65) Prior Publication Data
US 2024/0279071 A1  Aug. 22, 2024

Related U.S. Application Data

(60) Provisional application No. 63/386,892, filed on Dec. 9, 2022, provisional application No. 63/290,977, filed on Dec. 17, 2021.

(51) Int. Cl.
*C01B 33/158* (2006.01)
(52) U.S. Cl.
CPC .................. *C01B 33/1585* (2013.01)
(58) Field of Classification Search
None
See application file for complete search history.

(56) References Cited

U.S. PATENT DOCUMENTS

2016/0096949 A1*  4/2016  Evans ............... C04B 38/06
                                                      521/122
2019/0375644 A1* 12/2019  Grandi ............. C01B 33/1585
2021/0257690 A1   8/2021  Kilhenny et al.

FOREIGN PATENT DOCUMENTS

| CN | 118401301 | | 7/2024 |
| TW | 202340091 | A | 10/2023 |
| WO | WO-2020186495 | A1 | 9/2020 |
| WO | WO-2023115018 | A1 | 6/2023 |

OTHER PUBLICATIONS

Woigner et al ("Densification and Strengthening of Aerogels by Sintering Heat Treatments or Plastic Compression", Gels, (2018), 4, 12, pp. 1-9). (Year: 2018).*
"International Application Serial No. PCT/US2022/081835, International Search Report mailed Apr. 14, 2023", 4 pgs.
"International Application Serial No. PCT/US2022/081835, Written Opinion mailed Apr. 14, 2023", 5 pgs.
Yang, Guang, et al., "Evaluation of silica aerogel-reinforced polyurethane foams for footwear applications", Journal of Material Science, Kluwer Academic Publishers, Dordrecht, vol. 53, No. 13, (Mar. 26, 2018), 19 pgs.
"Korean Application Serial No. 10-2024-7010918, Voluntary Amendment Filed Apr. 1, 2024", w English Claims, 6 pgs.
"Chinese Application Serial No. 202280066409.6, Notification to Make Rectification mailed Apr. 26, 2024", with machine translation, 3 pgs.
"International Application Serial No. PCT US2022 081835, International Preliminary Report on Patentability mailed Jun. 27, 2024", 7 pgs.
"Japanese Application Serial No. 2024-519933, Voluntary Amendment filed May 15, 2024", w English claims, 8 pgs.
"Korean Application Serial No. 10-2024-7010918, Notice of Preliminary Rejection mailed Jul. 22, 2024", W English Translation, 8 pgs.

* cited by examiner

*Primary Examiner* — Michael Forrest
(74) *Attorney, Agent, or Firm* — Schwegman Lundberg & Woessner, P.A.

(57) ABSTRACT

This disclosure relates generally to aerogel technology. The disclosure relates more particularly, in various embodiments, to improved methods for producing aerogels and improved aerogel composites having a low compression set.

18 Claims, No Drawings

LOW COMPRESSION SET AEROGELS AND AEROGEL COMPOSITES AND METHODS OF MAKING

CROSS-REFERENCE TO RELATED APPLICATIONS

This application is a 371 National Stage of PCT/US2022/081835, filed Dec. 16, 2022, and entitled "Low Compression Set Aerogels and Aerogel Composites and Methods of Making" and published as WO 2023/115018 A1 on Jun. 22, 2023, which claims priority to and benefit of U.S. Provisional Patent Application No. 63/290,977, filed Dec. 17, 2021, and entitled "Low Compression Set Aerogels and Aerogel Composites and Methods of Making" and U.S. Provisional Patent Application No. 63/386,892, filed Dec. 9, 2022, and entitled "Low Compression Set Aerogels and Aerogel Composites and Methods of Making" each of which is herein incorporated by reference in its entirety.

TECHNICAL FIELD

The invention relates generally to aerogel technology. The invention relates more particularly, in various embodiments, to improved methods for producing aerogels and improved aerogel composites having a low compression set.

BACKGROUND

Low-density aerogel materials are widely considered to be the best solid insulators available. Aerogels function as insulators primarily by minimizing conduction (low structural density results in tortuous path for energy transfer through the solid framework), convection (large pore volumes and very small pore sizes result in minimal convection), and radiation (IR absorbing or scattering dopants are readily dispersed throughout the aerogel matrix). Aerogels can be used in a broad range of applications, including: heating and cooling insulation, acoustics insulation, electronic dielectrics, aerospace, energy storage and production, and filtration. Furthermore, aerogel materials display many other interesting acoustic, optical, mechanical, and chemical properties that make them abundantly useful in various insulation and non-insulation applications.

Aerogels are generally formed by extracting the liquid phase from a gel. The extraction of the liquid phase from a gel is performed in a manner that causes low shrinkage to the porous network and framework of the wet gel. The resulting aerogels, however, tend to be brittle and friable. Aerogel composites are aerogels that include a reinforcement material that improves features such as the flexibility and/or strength, of the aerogel material. Such composite aerogels, however, can still suffer from high compression set. It is desirable to improve deficiencies, such as high compression set, in aerogels and aerogel composites.

SUMMARY

It is an object of the present disclosure to obviate or mitigate at least one disadvantage of previous methods and materials mentioned above. The methods and material provided herein are designed to improve the compression set properties of aerogels and aerogel composites.

In an aspect of the present disclosure, the compression set of an aerogel, or an aerogel composite can be improved by heating the aerogel under an atmosphere comprising greater than 10% oxygen at a temperature between about 200° C. and 400° C. The resulting heat-treated aerogel has improved compression set properties. In an aspect of the present invention the aerogel or aerogel composite has a compression set greater than 15% as determined by ASTM D3574-Test D. After heat treatment in an oxygen containing atmosphere, the compression set of the aerogel improves to less than or equal to 15% as determined by ASTM D3574-Test D. During heating of the aerogel or aerogel composite, the temperature is limited to a temperature below 400° C.

In an aspect of the present disclosure, the atmosphere under which heating is performed comprises between about 15% oxygen to about 25% oxygen. In a preferred aspect of the present disclosure, the atmosphere is air.

In an aspect of the present disclosure, improvement of the compression set of an aerogel, or an aerogel composite is accomplished by heating the aerogel or aerogel composite at a temperature between about 200° C. and 400° C. for a time of about 30 seconds or more. In an aspect of the present disclosure, the aerogel or aerogel composite is heated for a time of 30 seconds to 3 hours.

In an aspect of the present disclosure, the aerogel or aerogel composite comprises silica. The aerogel or aerogel composite may also include a base. The base may be a base that was added to the gel-forming material to catalyze gel formation of the aerogel precursor gel, which remains in the aerogel. In an aspect of the present disclosure, the base is an amine base. The aerogel may include at least about 0.5% of the base. In an aspect of the present disclosure, the aerogel may include between 0.5% to about 10% of the base. Heat treatment of the aerogel or aerogel composite removes some of the base from the aerogel. In an aspect of the present disclosure, the amount of base in the aerogel or aerogel composite prior to heat treatment is greater than the amount of base in the aerogel or aerogel composite after heat treatment.

In an aspect of the present disclosure, the aerogel is an aerogel composite composed of an aerogel and a reinforcement material. In an aspect of the present disclosure, the reinforcement material is a fiber reinforcement material. The aerogel composite may also include an opacifying additive. Exemplary opacifying additives include, but are not limited to, boron carbide ($B_4C$), diatomite, manganese ferrite ($MnFe_2O_4$), manganese oxide (MnO), nickel oxide (NiO), tin oxide (SnO), silver oxide ($Ag_2O$), bismuth oxide ($Bi_2O_3$), titanium carbide (TiC), tungsten carbide (WC), silicon carbide (SiC), carbon black, titanium oxide ($TiO_2$), iron titanium oxide ($FeTiO_3$), zirconium silicate ($ZrSiO_4$), zirconium oxide ($ZrO_2$), iron (II) oxide (FeO), iron (III) oxide ($Fe_2O_3$), manganese dioxide ($MnO_2$), iron titanium oxide (ilmenite, $FeTiO_3$), chromium oxide ($CrO_2$), or mixtures thereof. In a preferred aspect of the present invention, the aerogel composite includes silicon carbide as an opacifying additive.

The methods described herein can be used to form aerogels and aerogel composites having improved compression set. These improved aerogel and aerogel composites can be used in variety of applications. In an aspect of the present disclosure, the improved aerogel and aerogel composites can be used in an insulation barrier of an electrical storage system.

In another aspect of the present disclosure an insulation barrier that includes an improved aerogel or aerogel composite can be used in battery module. A battery module includes a plurality of battery cells and one or more insulation barriers disposed between adjacent battery cells. The battery modules may be used in an electrical power system.

In an aspect of the present disclosure a device or vehicle includes a battery module or an electrical power system having insulation barrier that include the improved aerogel or aerogel composition. Exemplary devices include a laptop computer, PDA, mobile phone, tag scanner, audio device, video device, display panel, video camera, digital camera, desktop computers military portable computers military phones laser range finders digital communication device, intelligence gathering sensor, electronically integrated apparel, night vision equipment, power tool, calculator, radio, remote controlled appliance, GPS device, handheld and portable television, car starters, flashlights, acoustic devices, portable heating device, portable vacuum cleaner or a portable medical tool. The vehicle may be an electric vehicle.

DETAILED DESCRIPTION

It is to be understood the present invention is not limited to particular devices or methods, which may, of course, vary. It is also to be understood that the terminology used herein is for the purpose of describing particular examples only and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include." and derivations thereof, mean "including, but not limited to." The term "coupled" means directly or indirectly connected.

As used herein, "about" means approximately or nearly within the context in which it is presented. In an embodiment, the term "about" can include traditional rounding according to significant figures of the numerical value. In addition, the phrase "about 'x' to 'y'" includes "about 'x' to about 'y'".

Aerogels are a class of porous materials with open cells comprising a framework of interconnected structures, with a corresponding network of pores integrated within the framework, and an interstitial phase within the network of pores which is primarily comprised of gases such as air. Aerogels are typically characterized by a low density, a high porosity, a large surface area, and small pore sizes. Aerogels can be distinguished from other porous materials by their physical and structural properties. Within the context of the present disclosure an aerogel has (a) an average pore diameter ranging from about 2 nm to about 100 nm, (b) a porosity of at least 80% or more, and (c) a surface area of about 20 m$^2$/g or more, as determined using Nitrogen Porosimetry Testing. Aerogels of the present disclosure thus include any aerogels or other open celled compounds which satisfy these defining elements.

Aerogel materials may also be further characterized by additional physical properties, including: (d) a pore volume of about 2.0 mL/g or more, preferably about 3.0 mL/g or more; (e) a density of about 0.50 g/cc or less, preferably about 0.25 g/cc or less; and (f) at least 50% of the total pore volume comprising pores having a pore diameter of between 2 and 50 nm; though satisfaction of these additional properties is not required for the characterization of a compound as an aerogel material.

Production of an aerogel generally includes the following steps: i) formation of a sol-gel solution; ii) formation of a gel from the sol-gel solution; and iii) extracting the solvent from the gel materials to obtain a dried aerogel material. This process is discussed below in greater detail, specifically in the context of forming inorganic aerogels such as silica aerogels. However, the specific examples and illustrations provided herein are not intended to limit the present disclosure to any specific type of aerogel and/or method of preparation. The present disclosure can include any aerogel formed by any associated method of preparation known to those in the art.

The first step in forming an inorganic aerogel is generally the formation of a sol-gel solution through hydrolysis and condensation of metal alkoxide precursors in an alcohol-based solvent. Major variables in the formation of inorganic aerogels include the type of alkoxide precursors included in the sol-gel solution, the nature of the solvent, the processing temperature and pH of the sol-gel solution (which may be altered by addition of an acid or a base), and precursor/solvent/water ratio within the sol-gel solution. Control of these variables in forming a sol-gel solution can permit control of the growth and aggregation of the gel framework during the subsequent transition of the gel material from the "sol" state to the "gel" state. While properties of the resulting aerogels are affected by the pH of the precursor solution and the molar ratio of the reactants, any pH and any molar ratios that permit the formation of gels may be used in the present disclosure.

A sol-gel solution is formed by combining at least one gelling precursor with a solvent. Suitable solvents for use in forming a sol-gel solution include lower alcohols with 1 to 6 carbon atoms, preferably 2 to 4, although other solvents can be used as known to those with skill in the art. Examples of useful solvents include, but are not limited to: methanol, ethanol, isopropanol, ethyl acetate, ethyl acetoacetate, acetone, dichloromethane, tetrahydrofuran, and the like. Multiple solvents can also be combined to achieve a desired level of dispersion or to optimize properties of the gel material. Selection of optimal solvents for the sol-gel and gel formation steps thus depends on the specific precursors, fillers and additives being incorporated into the sol-gel solution; as well as the target processing conditions for gelling and liquid phase extraction, and the desired properties of the final aerogel materials.

Water can also be present in the precursor-solvent solution. The water acts to hydrolyze the metal alkoxide precursors into metal hydroxide precursors. The hydrolysis reaction can be (using TEOS in ethanol solvent as an example).

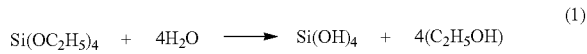

$$Si(OC_2H_5)_4 + 4H_2O \longrightarrow Si(OH)_4 + 4(C_2H_5OH) \qquad (1)$$

The resulting hydrolyzed metal hydroxide precursors remain suspended in the solvent solution in a "sol" state, either as individual molecules or as small polymerized (or oligomerized) colloidal clusters of molecules. For example, polymerization/condensation of the Si(OH)$_4$ precursors can occur as follows:

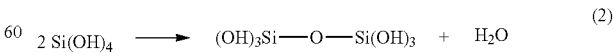

$$2\,Si(OH)_4 \longrightarrow (OH)_3Si\text{—}O\text{—}Si(OH)_3 + H_2O \qquad (2)$$

This polymerization can continue until colloidal clusters of polymerized (or oligomerized) SiO$_2$ (silica) molecules are formed.

Acids and bases can be incorporated into the sol-gel solution to control the pH of the solution, and to catalyze the hydrolysis and condensation reactions of the precursor materials. While any acid may be used to catalyze precursor reactions and to obtain a lower pH solution, preferable acids include: hydrochloric acid (HCl), sulfuric acid ($H_2SO_4$), phosphoric acid ($H_3PO_4$), oxalic acid and acetic acid.

Any base may likewise be used to catalyze precursor reactions and to obtain a higher pH solution, for example, ammonium hydroxide ($NH_4OH$). In an aspect of the present disclosure, amine bases may be used to catalyze precursor reactions. Within the context of the present disclosure, the term "amine base" refers to an organic compound that includes an amine group. For example, amine bases according to embodiments herein include, but are not limited to, trialkylamines, amidines, guanidines and imidazoles. Specific examples of amine bases include guanidine (e.g., as guanidinium hydroxide), 1,8-Diazabicyclo[5.4.0]undec-7-ene (DBU), 1,4-diazabicyclo[2.2.2]octane (DABCO), pyridine, imidazole, and 4,5-dihydroimidazole.

The sol-gel solution can include additional co-gelling precursors, as well as filler materials and other additives. Filler materials and other additives may be dispensed in the sol-gel solution at any point before or during the formation of a gel. Filler materials and other additives may also be incorporated into the gel material after gelation through various techniques known to those in the art. Preferably, the sol-gel solution comprising the gelling precursors, solvents, catalysts, water, filler materials and other additives is a homogenous solution which is capable of effective gel formation under suitable conditions.

Once a sol-gel solution has been formed and optimized, the gel-forming components in the sol-gel can be transitioned into a gel material. The process of transitioning gel-forming components into a gel material comprises an initial gel formation step wherein the gel solidifies up to the gel point of the gel material. The gel point of a gel material may be viewed as the point where the gelling solution exhibits resistance to flow and/or forms a substantially continuous polymeric framework throughout its volume. A range of gel-forming techniques are known to those in the art. Examples include but are not limited to: maintaining the mixture in a quiescent state for a sufficient period of time; adjusting the pH of the solution; adjusting the temperature of the solution; directing a form of energy onto the mixture (ultraviolet, visible, infrared, microwave, ultrasound, particle radiation, electromagnetic); or a combination thereof.

The process of transitioning gel-forming components into a gel material can also include an aging step (also referred to as curing) prior to liquid phase extraction. Aging a gel material after it reaches its gel point can further strengthen the gel framework by increasing the number of cross-linkages within the network. The duration of gel aging can be adjusted to control various properties within the resulting aerogel material. This aging procedure may be useful in preventing potential volume loss and shrinkage during liquid phase extraction. Aging may involve: maintaining the gel (prior to extraction) at a quiescent state for an extended period; maintaining the gel at elevated temperatures; adding cross-linkage promoting compounds; or any combination thereof. Preferred temperatures for aging are typically between about 10° C. and about 100° C., though other suitable temperatures are contemplated herein as well. The aging of a gel material typically continues up to the liquid phase extraction of the wet-gel material.

The time period for transitioning gel-forming materials into a gel material includes both the duration of the initial gel formation (from initiation of gelation up to the gel point), as well as the duration of any subsequent curing and aging of the gel material prior to liquid phase extraction (from the gel point up to the initiation of liquid phase extraction). The total time period for transitioning gel-forming materials into a gel material is typically between about 1 minute and several days, preferably about 30 hours or less, about 24 hours or less, about 15 hours or less, about 10 hours or less, about 6 hours or less, about 4 hours or less, about 2 hours or less, about 1 hour or less, about 30 minutes or less, or about 15 minutes or less.

Aging of the wet gel material can be accomplished by heating the wet gel material for a time sufficient to complete the aging process. In a typical aging process, a wet gel material is placed into an aging vessel. The wet gel material is then heated to an aging temperature and maintained at the aging temperature until the aging process is complete. Optionally, the wet gel material may be washed with an aging fluid prior to, and during, heating. The aging fluid may be used to replace the primary reaction solvent present in the wet-gel. Exemplary aging fluids are $C_1$-$C_6$ alcohols, cyclic alcohols, alicyclic alcohols, aromatic alcohols, polyhydric alcohols, ethers, ketones, or cyclic ethers. Preferred aging fluids include methanol and ethanol. During aging, aging fluid can be substantially continuously passed over and/or through the wet gel material and through the aging vessel. The aging fluid passing through the aging vessel and the wet gel can be fresh aging fluid or recycled aging fluid.

The amount of time needed to complete the aging process is related to the aging temperature of the wet gel material. Generally, the higher the aging temperature the faster the aging process is completed. The maximum temperature that can be used, however, is limited to the liquid present in the wet gel material. Under atmospheric pressure (1 atm, 101,325 Pa) the aging temperature is limited to the boiling point of the liquid in the wet gel material. Furthermore, it is undesirable to heat the aging material at or near the boiling point of the liquid. Evaporation of the aging fluid as the aging fluid is heated at or near the boiling point of the aging fluid can cause damage to the framework structure of the wet gel material. To reduce the chance of damaging the wet gel material, the aging process is typically conducted below the boiling point of the aging fluid in the wet gel material. For example, when using ethanol as the aging fluid, a wet gel material is typically aged at a temperature of 160° F. (71.1° C.), which is below the boiling point of ethanol (bp 173° F. (78.3° C.) at 1 atm (101,325 Pa)) for a time of from 1 hour up to 24 hours.

In an aspect of the present disclosure, the aging time of a wet gel material can be reduced by increasing the aging temperature of the wet gel material. While the aging temperature is generally limited to the normal boiling point of the aging fluid, the temperature can be increased beyond the normal boiling point of the aging fluid by increasing the pressure in the aging vessel. When the pressure inside the aging vessel (the "aging pressure") is maintained above the vapor pressure of the aging fluid, the temperature of the aging fluid can be increased beyond the normal boiling point of the aging fluid without boiling of the aging fluid. As used herein, the "normal boiling point" of a liquid is the temperature at which the liquid boils at 1 atm (101,325 Pa).

In an aspect of the present disclosure, a wet gel material is placed in a vessel that can be pressurized. The vessel also includes an input for the aging fluid and an output for fluid to leave the vessel. The vessel is sealed, and aging fluid is introduced into the vessel. The aging fluid may be the same fluid or a different fluid from the fluid used to make the wet gel material. In preferred aspects of the disclosure, the aging fluid is an alcohol (e.g., methanol or ethanol). The aging fluid is heated while maintaining the pressure inside the vessel above the vapor pressure of the aging fluid. The aging fluid can be heated by heating elements situated in or proximate to the vessel.

In an aspect of the present disclosure, during aging of the wet gel material, aging fluid may be removed, and aging fluid may be introduced substantially continuously. For example, aging fluid can be recirculated through the vessel. The aging fluid may be heated outside of the vessel before being reintroduced into the vessel. During aging, the pressure inside the vessel (the "aging pressure") is maintained above the vapor pressure of the liquid, particularly the vapor pressure of the liquid at the aging temperature since the vapor pressure of the aging fluid will increase with increasing temperature.

Increasing the aging temperature by increasing the pressure allows the aging time to be reduced. Under increased aging temperatures that aging time can be between 40 minutes and about 200 minutes.

The aging temperature is controlled, in part, by increasing the vapor pressure in the aging vessel. For example, if an aging temperature of 230 F (110 C) is desired for ethanol as the aging fluid, the vapor pressure inside the vessel will need to be at or above 315 kPa to ensure that the liquid does not begin to damage to the framework structure due to evaporation or boiling. In practice the pressure in the vessel is kept at a pressure that is at least 2 times, at least 3 times, at least 5 times, at least 10 times, or at least 20 times the vapor pressure of the aging liquid. For example, with ethanol as the aging fluid the pressure inside the vessel can be kept at a pressure of at least 630 kPa, at least 945 kPa, at least 1575 kPa, at least 3150 kPa, or at least 6300 kPa.

Further details regarding high temperature and high pressure aging of wet-gel materials is disclosed in U.S. Provisional Patent Application No. 63/416,017 which is incorporated herein by reference.

The resulting gel material may be washed in a suitable secondary solvent to replace the primary reaction solvent present in the wet-gel. Such secondary solvents may be linear monohydric alcohols with 1 or more aliphatic carbon atoms, dihydric alcohols with 2 or more carbon atoms, branched alcohols, cyclic alcohols, alicyclic alcohols, aromatic alcohols, polyhydric alcohols, ethers, ketones, cyclic ethers, or their derivative.

Once a gel material has been formed and processed, the liquid phase of the gel can then be at least partially extracted from the wet-gel using extraction methods to form an aerogel material. Liquid phase extraction, among other factors, plays an important role in engineering the characteristics of aerogels, such as porosity and density, as well as related properties such as thermal conductivity. Generally, aerogels are obtained when a liquid phase is extracted from a gel in a manner that causes low shrinkage to the porous network and framework of the wet gel.

Aerogels are commonly formed by removing the liquid mobile phase from the gel material at a temperature and pressure near or above the critical point of the liquid mobile phase. Once the critical point is reached (near critical) or surpassed (supercritical) (i.e., pressure and temperature of the system is at or higher than the critical pressure and critical temperature respectively) a new supercritical phase appears in the fluid that is distinct from the liquid or vapor phase. The solvent can then be removed without introducing a liquid-vapor interface, capillary pressure, or any associated mass transfer limitations typically associated with liquid-vapor boundaries. Additionally, the supercritical phase is more miscible with organic solvents in general, thus having the capacity for better extraction. Co-solvents and solvent exchanges are also commonly used to optimize the supercritical fluid drying process.

One embodiment of extracting a liquid phase from the wet-gel uses supercritical conditions of carbon dioxide, including, for example: first substantially exchanging the primary solvent present in the pore network of the gel with liquid carbon dioxide; and then heating the wet gel (typically in an autoclave) beyond the critical temperature of carbon dioxide (about 31.06° C.) and increasing the pressure of the system to a pressure greater than the critical pressure of carbon dioxide (about 1070 psig). The pressure around the gel material can be slightly fluctuated to facilitate removal of the supercritical carbon dioxide fluid from the gel. Carbon dioxide can be recirculated through the extraction system to facilitate the continual removal of the primary solvent from the wet gel. Finally, the temperature and pressure are slowly returned to ambient conditions to produce a dry aerogel material. Carbon dioxide can also be pre-processed into a supercritical state prior to being injected into an extraction chamber.

Further details describing the synthesis of aerogels can be found in U.S. Patent Application Publication No. 2016/0096949 to Evans et al. and U.S. Patent Application Publication No. 2021/03095227 to Evans et al., both of which are incorporated herein by reference.

Aerogel composites of the present disclosure can have a thickness of 15 mm or less, 10 mm or less, 5 mm or less, 3 mm or less, 2 mm or less, or 1 mm or less.

Aerogels made by the processes described herein can be brittle and friable unless additives or fillers are added to the gel precursor or gel. In particular, the use of fibers as a filler material, during the manufacture of the aerogel, can improve the flexibility and/or strength of the aerogel material. In an aspect of the present disclosure an aerogel composite is formed by adding a gel precursor composition to a fiber reinforcing phase and forming a gel from the gel precursor composition. The gel is subjected to liquid extraction (e.g., using supercritical $CO_2$) and dried to form an aerogel composite comprising an aerogel mixed with fiber. Further details describing the synthesis of aerogel-fiber composites can be found in U.S. Patent Application Publication No. 2016/0096949 to Evans et al. and U.S. Patent Application Publication No. 2021/03095227 to Evans et al., both of which are incorporated herein by reference.

Use of a reinforcing phase, e.g., a reinforcement material, to support the aerogel, allows the resulting aerogel composite to be more easily handled and manipulated. The reinforcement can be in the form of a fiber or foam. The reinforcement can be in the form of an elongated sheet of material. By selecting the appropriate ratio of aerogel to reinforcement, an aerogel composite can be obtained that is flexible and mechanically robust.

The reinforcing phase can be any material which provides increased flexibility, resilience, conformability, or structural stability to the aerogel material. Examples of well-known reinforcing materials include but are not limited to: open-cell foam reinforcement materials, closed-cell foam reinforcement materials, open-cell membranes, honeycomb reinforcement materials, polymeric reinforcement materials, and fiber reinforcement materials such as discrete fibers, woven materials, non-woven materials, battings, webs, mats, and felts. Additionally, fiber-based reinforcements may be combined with one or more of the other reinforcing materials and can be oriented continuously throughout or in limited preferred parts of the composition.

Examples of foam reinforcement materials include, but are not limited to, materials made from organic polymeric materials. Examples include materials made from polyolefins, polyurethanes, phenolics, melamine, cellulose acetate, and polystyrene. Materials made from melamine or melamine derivatives are also preferred in certain embodiments.

Examples of fiber reinforcement materials include, but are not limited to, discrete fibers, woven materials, non-woven materials, battings, webs, mats, felts, or combinations thereof. Fiber reinforcement materials can comprise a range of materials, including, but not limited to: Polyesters, polyolefin terephthalates, poly(ethylene) naphthalate, polycarbonates (examples Rayon, Nylon), cotton, (e.g. lycra manufactured by DuPont), carbon (e.g. graphite), polyacrylonitriles (PAN), oxidized PAN, uncarbonized heat treated PANs (such as those manufactured by SGL carbon), fiberglass based material (like S-glass, 901 glass, 902 glass, 475 glass, E-glass,) silica based fibers like quartz, (e.g. Quartzel manufactured by Saint-Gobain), Q-felt (manufactured by Johns Manville), Saffil (manufactured by Saffil), Durablanket (manufactured by Unifrax) and other silica fibers, combinations of silica based fibers and glass based fibers, Duraback (manufactured by Carborundum), Polyaramid fibers like Kevlar, Nomex, Sontera (all manufactured by DuPont), Conex (manufactured by Taijin), polyolefins like Tyvek (manufactured by DuPont), Dyneema (manufactured by DSM), Spectra (manufactured by Honeywell), other polypropylene fibers like Typar, Xavan (both manufactured by DuPont), fluoropolymers like PTFE with trade names as Teflon (manufactured by DuPont), Goretex (manufactured by W.L. GORE), Silicon carbide fibers like Nicalon (manufactured by COI Ceramics), ceramic fibers like Nextel (manufactured by 3M), Acrylic polymers, fibers of wool, silk, hemp, leather, suede, PBO-Zylon fibers (manufactured by Tyobo), Liquid crystal material like Vectan (manufactured by Hoechst), Cambrelle fiber (manufactured by DuPont), Polyurethanes, polyamaides, Wood fibers, Boron, Aluminum, Iron, Stainless Steel fibers and other thermoplastics like PEEK, PES, PEI, PEK, PPS.

One property of aerogel materials and aerogel composites that can vary widely is the compression set. As used herein, "compression set" is a measurement of the permanent deformation of a material remaining after removal of a force that was applied to the material. In the present disclosure, compression set is determined using ASTM D3574-Test D. The compression set is determined as a percentage of change in the thickness of a material before and after the application of a predetermined force. In one example of ASTM D3574-Test D, compression set can be determined from the following formula:

$$C_t = [(T_o - T_f)/T_o] \times 100$$

where $C_t$ is the compression set; $T_o$ is the original thickness of the material; and $T_f$ is the final thickness of the material after removal an applied force.

Aerogels without any additives to improve flexibility of the material tend to have high compression set (i.e., materials, after application of force is discontinued, return to less than 50% of their original thickness). Even fiber reinforced aerogels tend to have high compression set values. There is therefore a need to find a way to improve the compression set of aerogels and aerogel composites.

It has been found that heating an aerogel or an aerogel composite under an oxygen-containing atmosphere can improve the compression set of the heated material. Without being bound to any theory, it is believed that problems associated with the recovery of an aerogel, or an aerogel composite are related to the incomplete formation of the porous network. When the porous network is formed, weak points are formed where the reaction of the gel material is incomplete. These weak points can lead to collapse of the porous framework of the aerogel or aerogel composite. Once an aerogel collapses it is unable to recover its former state (e.g., its former thickness). It is believed that heating the aerogel in an oxygen atmosphere removes any residual catalysts (e.g., bases) and removes the weak points in the aerogel by promoting reactions at incomplete reaction sites within the porous network.

In an aspect of the present disclosure, a first aerogel is converted into a second aerogel that has a better (i.e., lower) compression set than the first aerogel. This is accomplished by providing a first aerogel having a compression set greater than 15% as determined by ASTM D3574-Test D. The first aerogel is heated under an atmosphere comprising greater than 10% oxygen at a temperature between about 200° C. and 400° C. to obtain the second aerogel. The first aerogel is heated for a time sufficient to alter the compression set of the second aerogel such that the second aerogel has a compression set less than or equal to 15% as determined by ASTM D3574-Test D.

In an aspect of the present disclosure, the first aerogel is heated under an atmosphere of greater than 10% oxygen, greater than 11% oxygen, greater than 12% oxygen, greater than 13% oxygen, greater than 14% oxygen, greater than 15% oxygen, greater than 16% oxygen, greater than 17% oxygen, greater than 18% oxygen, greater than 19% oxygen, greater than 20% oxygen, greater than 21% oxygen, greater than 22% oxygen, greater than 23% oxygen, greater than 24% oxygen, or greater than 25% oxygen. In an aspect of the present disclosure, the oxygen content of the atmosphere during heating of the first aerogel ranges from 10% oxygen to 30% oxygen, 15% oxygen to 25% oxygen, or 18% oxygen to 25% oxygen. In a preferred aspect of the present disclosure, the first aerogel is heated in air.

In an aspect of the present disclosure, the first aerogel is heated in an oxygen-containing atmosphere at a temperature of between 200° C. and 400° C., between 225° C. and 400° C., between 250° C. and 400° C., between 250° C. and 350° C., or between 300° C. and 400° C. During heating of the first aerogel, the temperature is limited to a temperature below 400° C.

The first aerogel is heated for a time sufficient to alter the compression set of the first aerogel such that the obtained second aerogel has a compression set less than or equal to 15% as determined by ASTM D3574-Test D. Exemplary times needed to accomplish this transformation can be 10 seconds, 30 seconds, 1 minute, 5 minutes, 10 minutes, 15 minutes, 30 minutes, 1 hour, 2 hours, or 3 hours or in a range between any two of these values. In an aspect of the present disclosure, the heating time is between 30 seconds and 3 hours, between 30 seconds and 2 hours, between 30 seconds and 1 hour, between 30 seconds and 45 minutes, between 30 seconds and 30 minutes, between 30 seconds and 15 minutes, between 30 seconds and 5 minutes, or between 30 seconds and 1 minute.

Heating an aerogel or an aerogel composite in an oxygen-containing atmosphere can result in the improvement of the compression set of the aerogel material. In an aspect of the invention, the compression set of the aerogel material after heat treatment in an oxygen-containing atmosphere will be less than or equal to 15%, less than or equal to 14%, less than or equal to 13%, less than or equal to 12%, less than or equal to 11%, less than or equal to 10%, less than or equal to 9%, less than or equal to 8%, less than or equal to 7%, less than or equal to 6%, or less than or equal to 5%.

The process of heating an aerogel in an oxygen-containing atmosphere can be applied to various aerogels and aerogel composites. In an aspect of the present disclosure, a silica aerogel composite is heated in an oxygen-containing atmosphere to improve the compression set of the aerogel composite. In an aspect of the present disclosure, a silica aerogel is formed by hydrolysis and condensation of silica-based gel-forming materials. Exemplary silica-based gel-forming material include, but are not limited to, silica-based alkoxides, metal silicates, alkoxysilanes, polyethylene silicates, and alkylalkoxysilanes.

In an aspect of the present disclosure, the gel-forming material comprise at least one hydrophobic group which can impart or improve certain properties in the gel such as stability and hydrophobicity. Exemplary gel-forming material that comprise a hydrophobic group include, but are not limited to, alkyl metal alkoxides, cycloalkyl metal alkoxides, and aryl metal alkoxides. In a specific aspect of the present disclosure, the gel-forming material is a silica based hydrophobic gel forming material. Examples of silica-based gel forming materials include but are not limited to: trimethyl methoxysilane [TMS]; dimethyl dimethoxysilane [DMS]; methyl trimethoxysilane [MTMS]; trimethyl ethoxysilane; dimethyl diethoxysilane [DMDES]; methyl triethoxysilane [MTES]; ethyl trictthoxysilane [ETES]; diethyl diethoxysilane; ethyl trictthoxysilane; propyl trimethoxysilane; propyl triethoxysilane; phenyl trimethoxysilane; phenyl trictthoxysilane [PhTES]; hexamethyldisilazane; and hexaethyldisilazane.

The gel-forming material may be converted into a gel using various techniques known in the art. In an aspect of the present disclosure, the gel-forming material may be converted into a gel using a base. Any base may be used to catalyze the gel formation reactions. In an aspect of the present disclosure, amine bases may be used to catalyze the gelation reactions. Exemplary bases that may be used include, but are not limited to, trialkylamines, amidines, guanidines and imidazoles. Specific examples of amine bases include guanidine (e.g., as guanidinium hydroxide), 1,8-Diazabicyclo[5.4.0]undec-7-ene (DBU), 1,4-diazabicyclo[2.2.2]octane (DABCO), pyridine, imidazole, and 4,5-dihydroimidazole. The amount of amine base used can range from about 0.5% to about 10% of the gel-forming material. After gelation and solvent removal, the resulting aerogel has from about 0.5% to about 10% of the amine base remaining in the aerogel.

It is believed that heating the aerogel at temperatures from 200° C. to 400° C. will cause some of the volatile bases (e.g., an amine base) to be removed from the aerogel. Thus, the amount of volatile base (e.g., amine base) present in the initial aerogel composite is greater than the amount of volatile base remaining in the aerogel composite after heating.

Aerogel composites may be fiber-reinforced with various fiber reinforcement materials to achieve a more flexible, resilient, and conformable composite product. The fiber reinforcement materials can be added to the gels at any point in the gelling process to produce a wet, fibrous gel composition. The wet gel composition may then be dried to produce a fiber-reinforced aerogel composite. Fiber reinforcement materials may be in the form of discrete fibers, woven materials, non-woven materials, battings, webs, mats, and felts. Fiber reinforcements can be made from organic fibrous materials, inorganic fibrous materials, or combinations thereof. Fiber reinforcement materials can comprise a range of materials, including, but not limited to: Polyesters, polyolefin terephthalates, poly(ethylene) naphthalate, polycarbonates (examples Rayon, Nylon), cotton. (e.g. lycra manufactured by DuPont), carbon (e.g. graphite), polyacrylonitriles (PAN), oxidized PAN, uncarbonized heat treated PANs (such as those manufactured by SGL carbon), fiberglass based material (like S-glass, 901 glass, 902 glass, 475 glass, E-glass,) silica based fibers like quartz, (e.g. Quartzel manufactured by Saint-Gobain), Q-felt (manufactured by Johns Manville), Saffil (manufactured by Saffil), Durablanket (manufactured by Unifrax) and other silica fibers, Duraback (manufactured by Carborundum), Polyaramid fibers like Kevlar, Nomex, Sontera (all manufactured by DuPont), Conex (manufactured by Taijin), polyolefins like Tyvek (manufactured by DuPont), Dyneema (manufactured by DSM), Spectra (manufactured by Honeywell), other polypropylene fibers like Typar, Xavan (both manufactured by DuPont), fluoropolymers like PTFE with trade names as Teflon (manufactured by DuPont), Goretex (manufactured by W.L. GORE), Silicon carbide fibers like Nicalon (manufactured by COI Ceramics), ceramic fibers like Nextel (manufactured by 3M), Acrylic polymers, fibers of wool, silk, hemp, leather, suede, PBO-Zylon fibers (manufactured by Tyobo), Liquid crystal material like Vectan (manufactured by Hoechst), Cambrelle fiber (manufactured by DuPont), Polyurethanes, polyamaides, Wood fibers, Boron, Aluminum, Iron, Stainless Steel fibers and other thermoplastics like PEEK, PES, PEI, PEK, PPS.

In an aspect of the present disclosure, non-woven fiber reinforcement materials are incorporated into the aerogel composite as continuous sheet of interconnected or interlaced fiber reinforcement materials. The process comprises initially producing a continuous sheet of fiber reinforced gel by casting or impregnating a gel precursor solution into a continuous sheet of interconnected or interlaced fiber reinforcement materials. The liquid phase may then be at least partially extracted from the fiber-reinforced gel sheets to produce a sheet-like, fiber reinforced aerogel composite.

In an aspect of the present disclosure, the aerogel composite may include an opacifying additive to reduce the radiative component of heat transfer. At any point prior to gel formation, opacifying compounds or precursors thereof may be dispersed into the mixture comprising gel-forming material. Exemplary opacifying additives include, but are not limited to, boron carbide ($B_4C$), diatomite, manganese ferrite ($MnFe_2O_4$), manganese oxide (MnO), nickel oxide (NiO), tin oxide (SnO), silver oxide ($Ag_2O$), bismuth oxide ($Bi_2O_3$), titanium carbide (TiC), tungsten carbide (WC), silicon carbide (SiC), carbon black, titanium oxide ($TiO_2$), iron titanium oxide ($FeTiO_3$), zirconium silicate ($ZrSiO_4$), zirconium oxide ($ZrO_2$), iron (II) oxide (FeO), iron (III) oxide ($Fe_2O_3$), manganese dioxide ($MnO_2$), iron titanium oxide (ilmenite, $FeTiO_3$), chromium oxide ($CrO_2$), or mixtures thereof. In a preferred aspect of the present invention, the aerogel composite includes silicon carbide as an opacifying additive.

Inorganic aerogels can also include gel precursors which comprise at least one hydrophobic group, such as alkyl metal alkoxides, cycloalkyl metal alkoxides, and aryl metal alkoxides, which can impart or improve certain properties in the gel such as stability and hydrophobicity. Inorganic silica aerogels can specifically include hydrophobic precursors such as alkylsilanes or arylsilanes. Hydrophobic gel precursors can be used as primary precursor materials to form the framework of a gel material. However, hydrophobic gel precursors are more commonly used as co-precursors in combination with simple metal alkoxides in the formation of amalgam aerogels. Hydrophobic inorganic precursor materials for silica based aerogel synthesis include, but are not limited to: trimethyl methoxysilane [TMS], dimethyl dimethoxysilane [DMS], methyl trimethoxysilane [MTMS], trimethyl ethoxysilane, dimethyl diethoxysilane [DMDS], methyl trictoxysilane [MTES], ethyl triethoxysilane [ETES], diethyl diethoxysilane, ethyl tricthoxysilane, propyl trimethoxysilane, propyl triethoxysilane, phenyl trimethoxysilane, phenyl triethoxysilane [PhTES], hexamethyldisilazane and hexaethyldisilazane, and the like.

Aerogels may also be treated to impart or improve hydrophobicity. Hydrophobic treatment can be applied to a sol-gel solution, a wet-gel prior to liquid phase extraction, or to an aerogel subsequent to liquid phase extraction. Hydrophobic treatment is especially common in the production of metal oxide aerogels, such as silica aerogels. Hydrophobic treatment is carried out by reacting a hydroxy moiety on a gel, such as a silanol group (Si—OH) present on a framework of a silica gel, with a functional group of a hydrophobizing agent. The resulting reaction converts the silanol group and the hydrophobizing agent into a hydrophobic group on the framework of the silica gel. The hydrophobizing agent compound may react with hydroxyl groups on the gel according to the following reaction:

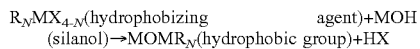

$R_N MX_{4-N}$(hydrophobizing agent)+MOH(silanol)→$MOMR_N$(hydrophobic group)+HX Hydrophobic treatment may take place both on the outer macro-surface of a silica gel, as well as on the inner-pore surfaces within the porous network of a gel.

A gel can be immersed in a mixture of a hydrophobizing agent and an optional hydrophobic-treatment solvent in which the hydrophobizing agent is soluble, and which is also miscible with the gel solvent in the wet-gel. A wide range of hydrophobic-treatment solvents may be used, including solvents such as methanol, ethanol, isopropanol, xylene, toluene, benzene, dimethylformamide, and hexane. Hydrophobizing agents in liquid or gaseous form may also be directly contacted with the gel to impart hydrophobicity.

The hydrophobic treatment process can include mixing or agitation to help the hydrophobizing agent to permeate the wet-gel. The hydrophobic treatment process can also include varying other conditions such as temperature and pH to further enhance and optimize the treatment reactions. After the reaction is completed, the wet-gel is washed to remove unreacted compounds and reaction by-products.

Hydrophobizing agents for hydrophobic treatment of an aerogel are generally compounds of the formula: $RNMX_{4-N}$; where M is the metal; R is a hydrophobic group such as $CH_3$, $CH_2CH_3$, $C_6H_6$, or similar hydrophobic alkyl, cycloalkyl, or aryl moieties; and X is a halogen, usually Cl. Specific examples of hydrophobizing agents include, but are not limited to: trimethylchlorosilane [TMCS], triethylchlorosilane [TECS], triphenylchlorosilane [TPCS], dimethylchlorosilane [DMCS], dimethyldichlorosilane [DMDCS], and the like. Hydrophobizing agents can also be of the formula: $Y(R_3M)_2$; where M is a metal; Y is bridging group such as NH or O; and R is a hydrophobic group such as $CH_3$, $CH_2CH_3$, $C_6H_6$, or similar hydrophobic alkyl, cycloalkyl, or aryl moieties. Specific examples of such hydrophobizing agents include but are not limited to: hexamethyldisilazane [HMDZ] and hexamethyldisiloxane [HMDSO]. Hydrophobizing agents can further include compounds of the formula: $RNMV_{4-N}$, wherein V is a reactive or leaving group other than a halogen. Specific examples of such hydrophobizing agents include but are not limited to: vinyltriethoxysilane and vinyltrimethoxysilane.

Within the context of the present disclosure, the term "hydrophobic-bound silicon" refers to a silicon atom within the framework of a gel or aerogel which comprises at least one hydrophobic group covalently bonded to the silicon atom. Examples of hydrophobic-bound silicon include, but are not limited to, silicon atoms in silica groups within the gel framework which are formed from gel precursors comprising at least one hydrophobic group (such as MTES or DMDS). Hydrophobic-bound silicon can also include, but are not limited to, silicon atoms in the gel framework or on the surface of the gel which are treated with a hydrophobizing agent (such as HMDZ) to impart or improve hydrophobicity by incorporating additional hydrophobic groups into the composition. Hydrophobic groups of the present disclosure include, but are not limited to, methyl groups, ethyl groups, propyl groups, isopropyl groups, butyl groups, isobutyl groups, tertbutyl groups, octyl groups, phenyl groups, or other substituted or unsubstituted hydrophobic organic groups known to those with skill in the art. Within the context of the present disclosure, the terms "hydrophobic group," "hydrophobic organic material," and "hydrophobic organic content" specifically exclude readily hydrolysable organic silicon-bound alkoxy groups on the framework of the gel material which are the product of reactions between organic solvents and silanol groups.

Within the context of the present disclosure, the terms "aliphatic hydrophobic group," "aliphatic hydrophobic organic material," and "aliphatic hydrophobic organic content" describe hydrophobic groups on hydrophobic-bound silicon which are limited to aliphatic hydrocarbons, including, but not limited to hydrocarbon moieties containing 1-40 carbon atoms which can be saturated or unsaturated (but not aromatic), which can include straight-chain, branched, cyclic moieties (including fused, bridging, and spiro-fused polycyclic), or combinations thereof, such as alkyl, alkenyl, alkynyl, (cycloalkyl)alkyl, (cycloalkenyl)alkyl, or (cycloalkyl)alkenyl moieties, and hetero-aliphatic moieties (wherein one or more carbon atoms are independently replaced by one or more atoms selected from the group consisting of oxygen, sulfur, nitrogen, or phosphorus). In certain embodiments of the present disclosure, at least 50% of the hydrophobic organic material in the aerogel composition comprises aliphatic hydrophobic groups.

Within the context of the present disclosure, the term "hydrophobic organic content" refers to the amount of hydrophobic organic material bound to the framework in an aerogel material or composition. The hydrophobic organic content of an aerogel material or composition can be expressed as a weight percentage of the amount of hydrophobic organic material on the aerogel framework relative to the total amount of material in the aerogel material or composition. Hydrophobic organic content can be calculated by those with ordinary skill in the art based on the nature and relative concentrations of materials used in producing the aerogel material or composition. Hydrophobic organic content can also be measured using thermo-gravimetric analysis (TGA) in an inert atmosphere. Specifically, the percentage of hydrophobic organic material in an aerogel can be correlated with the percentage of weight loss in a hydrophobic aerogel material or composition when subjected to combustive heat temperatures during a TGA analysis, with adjustments being made for the loss of moisture, loss of residual solvent, and the loss of readily hydrolysable alkoxy groups during the TGA analysis.

Aerogel materials or compositions of the present disclosure can have a hydrophobic organic content of 50 wt % or less, 40 wt % or less, 30 wt % or less, 25 wt % or less, 20 wt % or less, 15 wt % or less, 10 wt % or less, 8 wt % or less, 6 wt % or less, 5 wt % or less, 4 wt % or less, 3 wt % or less, 2 wt % or less, 1 wt % or less, or in a range between any two of these values.

The low thermal conductivity of aerogel materials and aerogel composites makes them ideal materials for insulation applications. In one exemplary use, an aerogel composite may be used as a thermal barrier between individual, or groups of, battery cells. Battery cells are susceptible to catastrophic failure under "abuse conditions." Abuse conditions include mechanical abuse, electrical abuse, and thermal abuse. One or all of these abuse conditions cab be initiated externally or internally. For example, service induced stress, aging, errors in design e.g. configurational parameters such as cell spacing, cell interconnecting style, cell form factor, manufacturing, operation, and maintenance are internal mechanical factors that can cause various kinds of abuse. External mechanical factors include damage or injury to a LIB, such as from a fall or from a penetration of the cell. Electrical abuse conditions mainly include internal or external short-circuiting of a battery cell, overcharge, and over discharge. Thermal abuse is typically triggered by overheating. For example, overheating in a battery cell may be caused by operating the battery cell under high ambient temperatures. Internally, thermal abuse may be caused by electrical and mechanical defects in the battery cells.

Thermal runaway may occur in a battery cell due to electrical mechanical, or thermal abuse conditions. The term "thermal runaway" refers to the situation when the internal reaction rate of a battery cell increases to the point that more heat is being generated than can be withdrawn, leading to a further increase in both reaction rate and heat generation. During thermal runaway, high temperatures trigger a chain of exothermic reactions in a battery, causing the battery's temperature to increase rapidly. In many cases, when thermal runaway occurs in one battery cell, the generated heat quickly heats up the cells in close proximity to the cell experiencing thermal runaway. Each cell that is added to a thermal runaway reaction contains additional energy to continue the reactions, causing thermal runaway propagation within the battery pack, eventually leading to a catastrophic failure of the battery pack by fire or explosion. Prompt heat dissipation and effective block of heat transfer paths can be effective countermeasures to reduce the hazard caused by thermal runaway propagation.

In an aspect of the present disclosure, an aerogel or aerogel composite is heated at under an atmosphere comprising greater than 10% oxygen at a temperature between about 200° C. and 400° C. to reduce the compression set of the aerogel material. The heated aerogel or heated aerogel composite, having a compression set of less than or equal to 15% as determined by ASTM D3574-Test D, can be used as a barrier material or as part of a multilayer barrier material that is positioned between battery cells. The improved compression set allows the aerogel or aerogel composite to contract and expand in response to expansion and contraction, respectively, of the adjacent battery cells without, or with a minimum of, permanent deformation of the aerogel or aerogel composite.

Battery modules and battery packs can be used to supply electrical energy to a device or vehicles. Device that use battery modules or battery packs include, but are not limited to, a laptop computer, PDA, mobile phone, tag scanner, audio device, video device, display panel, video camera, digital camera, desktop computers military portable computers military phones laser range finders digital communication device, intelligence gathering sensor, electronically integrated apparel, night vision equipment, power tool, calculator, radio, remote controlled appliance, GPS device, handheld and portable television, car starters, flashlights, acoustic devices, portable heating device, portable vacuum cleaner or a portable medical tool. When used in a vehicle, a battery pack can be used for an all-electric vehicle, or in a hybrid vehicle.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention. Comparative Testing of Aerogel Composites Using ASTM D 3574-Test D Test 1—Comparison of Nitrogen Anneal v. Air Anneal A silica-based aerogel composite having a thickness of 2.25 mm was tested using ASTM D 3574-Test D, before and after heat treatment (Aerogel Sample S100142). The aerogel composite had a silica density of 0.085 g/cc, a SiC content of 35%, and a hydrophobic content of 36%. The samples were tested by compressing the aerogel specimen at a max strain of 50% of the unstressed thickness, holding in the compressed state for 20 minutes, releasing the compression on the sample, and measuring the change in the thickness of the specimen after 24 hours in the uncompressed state. Results of this testing are summarized in Table 1. As shown in Table 1, the untreated aerogel composite has a compression set of 49.6%. Treatment of the aerogel composite by heating in a nitrogen atmosphere (oxygen content less than 10%) at 350° C. improves the compression set to 16%, 23%, or 31% depending on the amount of time the aerogel composite was heated under a nitrogen atmosphere. Significantly better improvement of the compression set was achieved by heating the aerogel composite under an air atmosphere. Treatment of the aerogel composite by heating in an air atmosphere (oxygen content approximately 21%) at 350° C. improves the compression set to under 15% (specifically 5.6%, 10.2% and 2.0%, depending on the amount of time the aerogel composite was heated under air).

TABLE 1

| Material ID | Treatment Temperature (° C.) | Treatment ATM | Treatment Duration (min) | Max Strain (%) | Duration of hold (min) | Compression Set (%) |
|---|---|---|---|---|---|---|
| S100142 | None | None | None | 50 | 20 | 49.60 |
| S100142 | 350 | $N_2$ | 15 | 50 | 20 | 23.20 |
| S100142 | 350 | $N_2$ | 10 | 50 | 20 | 31.00 |
| S100142 | 350 | $N_2$ | 5 | 50 | 20 | 16.00 |
| S100142 | 350 | Air | 15 | 50 | 20 | 5.60 |
| S100142 | 350 | Air | 10 | 50 | 20 | 10.20 |
| S100142 | 350 | Air | 5 | 50 | 20 | 2.00 |

Test 2—Comparison of Treatment Temperatures

A silica-based aerogel composite having a thickness of 2.25 mm was tested using ASTM D 3574-Test D, before and after heat treatment (Aerogel Sample S100142). The aerogel composite had a silica density of 0.085 g/cc, a SiC content of 35%, and a hydrophobic content of 36%. The samples were tested by compressing the aerogel specimen at a max strain of 60% of the unstressed thickness, holding in the compressed state for 20 minutes, releasing the compression on the sample, and measuring the change in the thickness of the specimen after 24 hours in the uncompressed state. Results of this testing are summarized in Table 2. In this test, the effect of treatment temperature was studied. As shown in Table 2, the best results were achieved at a treatment temperature of 350° C. (2.86% compression set). Treatment of the sample in air above 400° C. can result in decomposition of the sample, by oxidation, and represents the upper limit of this treatment.

TABLE 2

| Material ID | Treatment Temperature (° C.) | Treatment ATM | Treatment Duration (min) | Max Strain (%) | Duration of hold (min) | Compression Set (%) |
|---|---|---|---|---|---|---|
| S100142 | None | None | None | 60 | 20 | 18.16 |
| S100142 | 150 | Air | 30 | 60 | 20 | 23.20 |
| S100142 | 250 | Air | 30 | 60 | 20 | 31.00 |
| S100142 | 350 | Air | 30 | 60 | 20 | 16.00 |

Test 3—Comparison of Thickness of Aerogel Sample of Compression Set

A silica-based aerogel composite having a thickness of 4 mm was tested using ASTM D 3574-Test D, before and after heat treatment (Aerogel Sample S100144). The aerogel composite had a silica density of 0.085 g/cc, a SiC content of 35%, and a hydrophobic content of 36%. The samples were tested by compressing the aerogel specimen at a max strain of 60% of the unstressed thickness, holding in the compressed state for 10 minutes, releasing the compression on the sample, and measuring the change in the thickness of the specimen after 24 hours in the uncompressed state. Results of this testing are summarized in Table 3. Similar to the results of Test 1, a reduction in compression set to below 15% was achieved at a treatment temperature of 350° C. in air (11.17% compression set).

TABLE 3

| Material ID | Treatment Temperature (° C.) | Treatment ATM | Treatment Duration (min) | Duration of hold (min) | Compression Set (%) |
|---|---|---|---|---|---|
| S100144 | None | None | None | 10 | 32.17 |
| S100144 | 350 | Air | 30 | 10 | 11.17 |

Test 4—Effect of Aerogel Anneal Temperature on Compression Set

A silica-based aerogel composite having a thickness of 4 mm was tested using ASTM D 3574-Test D, before and after heat treatment (Aerogel Sample S100144). The aerogel composite had a silica density of 0.085 g/cc, a SiC content of 35%, and a hydrophobic content of 36%. The samples were tested by compressing the aerogel specimen at a max strain of 50% of the unstressed thickness, holding in the compressed state for 960 minutes, releasing the compression on the sample, and measuring the change in the thickness of the specimen after 24 hours in the uncompressed state. Results of this testing are summarized in Table 4. Similar to the results of Test 3, a reduction in compression set to below 15% was achieved at a treatment temperature of 350° C. in air (9.2% compression set).

TABLE 4

| Material ID | Treatment Temperature (° C.) | Treatment ATM | Treatment Duration (min) | Duration of hold (min) | Compression Set (%) |
|---|---|---|---|---|---|
| S100144 | None | None | None | 960 | 73.20 |
| S100144 | 350 | Air | 30 | 960 | 9.20 |

Test 5—Effect of Anneal Temperature on Compression Set

A silica-based aerogel composite having a thickness of 4 mm was tested using ASTM D 3574-Test D, before and after heat treatment (Aerogel Sample S100144). The aerogel composite had a silica density of 0.085 g/cc, a SiC content of 35%, and a hydrophobic content of 36%. The samples were tested by compressing the aerogel specimen at a max strain of 60% of the unstressed thickness, holding in the compressed state for 20 minutes, releasing the compression on the sample, and measuring the change in the thickness of the specimen after 24 hours in the uncompressed state. Results of this testing are summarized in Table 5. In this test, the effect of treatment temperature was studied. As shown in Table 5, the best results were achieved at a treatment temperature of 350° C. (12.71% compression set). Treatment of the sample in air above 400° C. can result in decomposition of the sample, by oxidation, and represents the upper limit of this treatment.

TABLE 5

| Material ID | Treatment Temperature (° C.) | Treatment ATM | Treatment Duration (min) | Duration of hold (min) | Compression Set (%) |
|---|---|---|---|---|---|
| S100144 | None | None | None | 20 | 47.85 |
| S100144 | 150 | Air | 30 | 20 | 38.94 |
| S100144 | 250 | Air | 30 | 20 | 15.04 |
| S100144 | 350 | Air | 30 | 20 | 12.71 |

Test 6—Comparison of Base Used to Form Aerogel

Silica-based aerogel composites were tested using ASTM D 3574-Test D, before and after heat treatment. The first silica-aerogel composite (Guanidine) was formed using guanidine as a base catalyzing the wet-gel formation. The first silica-aerogel composite had a hydrophobic content of 36%. The second silica-aerogel composite (Ammonia) was formed using ammonia as a base catalyzing the wet-gel formation. The second silica-aerogel composite had a hydrophobic content of 36%. The samples were tested by compressing the aerogel specimen at a max strain of 50% of the unstressed thickness, holding in the compressed state for 20 minutes, releasing the compression on the sample, and measuring the change in the thickness of the specimen after 24 hours in the uncompressed state. Results of this testing are summarized in Table 6. A more substantial reduction in compression set is achieved in samples formed with guanidine compared to samples that are formed with ammonia.

TABLE 6

| Material ID | Treatment Temperature (° C.) | Treatment ATM | Treatment Duration (min) | Duration of hold (min) | Compression Set (%) |
|---|---|---|---|---|---|
| Guanidine | None | None | None | 20 | 42.7 |
| Ammonia | None | None | None | 20 | 48.5 |
| Guanidine | 650 | N2 | 10 | 20 | 4.4 |
| Ammonia | 650 | N2 | 10 | 20 | 5.5 |
| Guanidine | 350 | N2 | 30 | 20 | 6.8 |
| Ammonia | 350 | N2 | 30 | 20 | 26.0 |
| Guanidine | 350 | Air | 30 | 20 | 5.6 |
| Ammonia | 350r | Air | 30 | 20 | 38.7 |

Test 7—Comparative Cyclic Testing of Aerogel Composites

A silica-based aerogel composite having a thickness of 2.25 mm was tested using cyclic compression (Aerogel Sample S100142). The aerogel composite had a silica density of 0.085 g/cc, a SiC content of 35%, and a hydrophobic content of 36%. This test was based upon a custom methodology aimed at evaluating the materials resilience in a cyclic test that subjects the material to a series of compression cycles. Specifically, materials were cycled to the peak strain target (60% strain) at 2 mm/min, held at that strain target for a duration of 15 min, unloaded to the lower strain target (50% strain), held at this strain for 15 min and then brought back to the peak strain condition. This cycle was repeated 35 times for each material in the database and the % recovery for the material was reported after a 24-hour recovery period. Results of this testing are summarized in Table 7. As shown in Table 7, the untreated aerogel composite has a compression set of 49.6%. Treatment of the aerogel composite by heating under an air atmosphere at 350° C. improves the compression set to 4.6% after cyclic testing.

TABLE 7

| Material ID | Treatment Temperature (° C.) | Treatment ATM | Treatment Duration (min) | Strain Range (%) | Compression Set (%) |
|---|---|---|---|---|---|
| S100142 | None | None | None | 50-60 | 46.8 |
| S100142 | 350 | Air | 30 | 50-60 | 4.6 |

Test 8—Effect of Aging Temperature on Compression Set

A silica-based aerogel composite was tested using ASTM D 3574-Test D and cyclic testing, before and after heat treatment (Aerogel Sample S100149). The aerogel composite had a silica density of 0.055 g/cc, a SiC content of 35%, and a hydrophobic content of 36%. The silica-based aerogel composite was made under standard aging conditions (Standard) or under high temperature, high pressure aging conditions (87° C., HTHP). All samples were annealed under air at 350° C. The samples were tested by compressing the aerogel specimen at a max strain of 60% of the unstressed thickness, holding in the compressed state for 20 minutes, releasing the compression on the sample, and measuring the change in the thickness of the specimen after 24 hours in the uncompressed state. ASTM D 3574 testing results are presented in Table 8. For cyclic testing, materials were cycled to a peak strain in the range of 50-60% at 2 mm/min, held at that strain target for a duration of 15 min, unloaded to the lower strain target (50% strain), held at this strain for 15 min and then brought back to the peak strain condition. This cycle was repeated 35 times for each material in the database and the % recovery for the material was reported after a 24-hour recovery period. Cyclic testing results are summarized in Table 9. The results show that non-annealed HTHP samples outperform the non-annealed Standard samples. The full benefit of an annealed HTHP sample compared to a Standard sample is realized following cyclic testing.

TABLE 8

| Material ID | Aging Process | Treatment Temperature (° C.) | Treatment Duration (min) | Strain (%) | Compression Set (%) |
|---|---|---|---|---|---|
| S100149 | HTHP | None | None | 60 | 35.8 |
| S100149 | Standard | None | None | 60 | 68.1 |
| S100149 | HTHP | 350 C. | 30 | 60 | 11.4 |
| S100149 | Standard | 350 C. | 30 | 60 | 17.6 |

TABLE 9

| Material ID | Aging Process | Treatment Temperature (° C.) | Treatment Duration (min) | Strain Range (%) | Compression Set (%) |
|---|---|---|---|---|---|
| S100149 | HTHP | None | None | 50-60 | 71.0 |
| S100149 | Standard | None | None | 50-60 | 83.0 |
| S100149 | HTHP | 350 C. | 30 | 50-60 | 13.8 |
| S100149 | Standard | 350 C. | 30 | 50-60 | 57.6 |

Test 9—Effect of Aging Temperature on Compression Set

Silica-based aerogel composites were tested using mono-compression and cyclic compression testing. The aerogel composite had a silica density of 0.055 g/cc, a SiC content of 35%, and a hydrophobic content of 36%. The silica-based aerogel composite was made under high temperature, high pressure aging conditions (HTHP) at temperatures of 80° C., 90° C., 100° C., and 110° C. All samples were annealed under air at 350° C. The samples were tested by compressing the aerogel specimen at a max strain of 50% of the unstressed thickness, holding in the compressed state for 24 hours, and measuring the change in the thickness of the specimen after 24 hours. Mono-compression testing results are presented in Table 10. For cyclic testing, materials were cycled to a peak strain in the range of 50-60% at 2 mm/min, held at that strain target for a duration of 15 min, unloaded to the lower strain target (50% strain), held at this strain for 15 min and then brought back to the peak strain condition. This cycle was repeated 50 times for each material and the % recovery for the material was reported after a 24-hour recovery period. Cyclic testing results are summarized in Table 11. The results show that increasing the aging temperature improves the compression set behavior. The cyclic testing results show that higher aging temperatures improve the compression set and allows for minimum stress values to remain above 40 kPa after 50 cycles.

TABLE 10

| Material ID | Aging Temperature | Treatment Temperature (° C.) | Treatment Duration (min) | Strain (%) | Compression Set (%) |
|---|---|---|---|---|---|
| S100142 | 80 C. | 350 C. | 30 | 50 | 11.7 |
| S100142 | 90 C. | 350 C. | 30 | 50 | 11.1 |
| S100142 | 100 C. | 350 C. | 30 | 50 | 9.4 |
| S100142 | 110 C. | 350 C. | 30 | 50 | 17.6 |

TABLE 11

| Material ID | Aging Temperature | Treatment Temperature (° C.) | Treatment Duration (min) | Strain Range (%) | Compression Set (%) |
|---|---|---|---|---|---|
| S100142 | 80 C. | 350 C. | 30 | 50-60 | 59.4 |
| S100142 | 90 C. | 350 C. | 30 | 50-60 | 54.9 |
| S100142 | 100 C. | 350 C. | 30 | 50-60 | 32.8 |
| S100142 | 110 C. | 350 C. | 30 | 50-60 | 24.5 |

Test 10—Effect of Aging Temperature/Silica Density on 60% Strain Compression Set Silica-based aerogel composites were tested using mono-compression testing. The aerogel composite had a SiC content of 35%, and a hydrophobic content of 36%. The silica density of the aerogel was either 0.065 g/cc (Aero65), 0.075 g/cc (Aero75), 0.085 g/cc (Aero85), or 0.095 g/cc (Aero95) silica density. The silica-based aerogel composites were made under high temperature, high pressure aging conditions (HTHP) at 110° C. Aerogel composite width was 2.5 mm or 5 mm. The samples were tested by compressing the aerogel specimen at a max strain of 60% of the unstressed thickness, holding in the compressed state for 24 hours, releasing the compression on the sample, and measuring the change in the thickness of the specimen immediately (Immediate) and after 24 hours (24 Hours) in the uncompressed state. Mono-compression testing results for 2.5 mm sample width are presented in Table 12 and 5 mm sample width results are presented in Table 13. Both immediate spring back and final compression set improves (lowers) with increasing silica density.

TABLE 12

| Material ID | Silica Density | Sample Width | Strain (%) | Measurement Time | Compression Set (%) |
|---|---|---|---|---|---|
| Aero65 | 0.065 g/cc | 2.5 mm | 60 | Immediate | 42.4 |
| Aero65 | 0.065 g/cc | 2.5 mm | 60 | 24 Hours | 19.4 |
| Aero75 | 0.075 g/cc | 2.5 mm | 60 | Immediate | 31.6 |

TABLE 12-continued

| Material ID | Silica Density | Sample Width | Strain (%) | Measurement Time | Compression Set (%) |
|---|---|---|---|---|---|
| Aero75 | 0.075 g/cc | 2.5 mm | 60 | 24 Hours | 13.2 |
| Aero85 | 0.085 g/cc | 2.5 mm | 60 | Immediate | 20.5 |
| Aero85 | 0.085 g/cc | 2.5 mm | 60 | 24 Hours | 10.7 |
| Aero95 | 0.095 g/cc | 2.5 mm | 60 | Immediate | 11.9 |
| Aero95 | 0.095 g/cc | 2.5 mm | 60 | 24 Hours | 4.6 |

TABLE 13

| Material ID | Silica Density | Sample Width | Strain (%) | Measurement Time | Compression Set (%) |
|---|---|---|---|---|---|
| Aero65 | 0.065 g/cc | 5 mm | 60 | Immediate | 32.6 |
| Aero65 | 0.065 g/cc | 5 mm | 60 | 24 Hours | 12.2 |
| Aero75 | 0.075 g/cc | 5 mm | 60 | Immediate | 25.7 |
| Aero75 | 0.075 g/cc | 5 mm | 60 | 24 Hours | 9.5 |
| Aero85 | 0.085 g/cc | 5 mm | 60 | Immediate | 18.5 |
| Aero85 | 0.085 g/cc | 5 mm | 60 | 24 Hours | 1.9 |
| Aero95 | 0.095 g/cc | 5 mm | 60 | Immediate | 15.6 |
| Aero95 | 0.095 g/cc | 5 mm | 60 | 24 Hours | 8.3 |

Test 11—Effect of Aging Temperature/Silica Density on 80% Strain Compression Set Silica-based aerogel composites were tested using mono-compression testing. The aerogel composite had a SiC content of 35%, and a hydrophobic content of 36%. The silica density of the aerogel was either 0.065 g/cc (Aero65), 0.075 g/cc (Aero75), 0.085 g/cc (Aero85), or 0.095 g/cc (Aero95) silica density. The silica-based aerogel composites were made under high temperature, high pressure aging conditions (HTHP) at 110° C. Aerogel composite width was 2.5 mm or 5 mm. The samples were tested by compressing the aerogel specimen at a max strain of 80% of the unstressed thickness, holding in the compressed state for 24 hours, releasing the compression on the sample, and measuring the change in the thickness of the specimen immediately (Immediate) and after 24 hours (24 Hours) in the uncompressed state. Mono-compression testing results for 2.5 mm sample width are presented in Table 14. 5 mm sample widths are presented in Table 15. Both immediate spring back and final compression set improves (lowers) with increasing silica density.

TABLE 14

| Material ID | Silica Density | Sample Width | Strain (%) | Measurement Time | Compression Set (%) |
|---|---|---|---|---|---|
| Aero65 | 0.065 g/cc | 2.5 mm | 80 | Immediate | 93.7 |
| Aero65 | 0.065 g/cc | 2.5 mm | 80 | 24 Hours | 87.3 |
| Aero75 | 0.075 g/cc | 2.5 mm | 80 | Immediate | 89.1 |
| Aero75 | 0.075 g/cc | 2.5 mm | 80 | 24 Hours | 91.9 |
| Aero85 | 0.085 g/cc | 2.5 mm | 80 | Immediate | 87.3 |
| Aero85 | 0.085 g/cc | 2.5 mm | 80 | 24 Hours | 73.6 |
| Aero95 | 0.095 g/cc | 2.5 mm | 80 | Immediate | 81.1 |
| Aero95 | 0.095 g/cc | 2.5 mm | 80 | 24 Hours | 65.6 |

TABLE 15

| Material ID | Silica Density | Sample Width | Strain (%) | Measurement Time | Compression Set (%) |
|---|---|---|---|---|---|
| Aero65 | 0.065 g/cc | 5 mm | 80 | Immediate | 99.7 |
| Aero65 | 0.065 g/cc | 5 mm | 80 | 24 Hours | 92.4 |
| Aero75 | 0.075 g/cc | 5 mm | 80 | Immediate | 100.4 |
| Aero75 | 0.075 g/cc | 5 mm | 80 | 24 Hours | 86.6 |
| Aero85 | 0.085 g/cc | 5 mm | 80 | Immediate | 93.6 |

TABLE 15-continued

| Material ID | Silica Density | Sample Width | Strain (%) | Measurement Time | Compression Set (%) |
|---|---|---|---|---|---|
| Aero85 | 0.085 g/cc | 5 mm | 80 | 24 Hours | 79.7 |
| Aero95 | 0.095 g/cc | 5 mm | 80 | Immediate | 85.0 |
| Aero95 | 0.095 g/cc | 5 mm | 80 | 24 Hours | 71.5 |

Test 12—Effect of Annealing Temperature on Compression Set of HTHP Samples

Silica-based aerogel composites were tested using mono-compression testing and cyclic testing. The aerogel composite had a SiC content of 35%, and a hydrophobic content of 36%. The silica-based aerogel composites were made under high temperature, high pressure aging conditions (HTHP) at 110° C. Aerogel composite width was 5 mm. Samples were annealed at 250° C., 275° C., 300° C., 325° C., or 350° C. in air. The samples were tested by mono-compression of the aerogel specimen at a max strain of 60% or 80% of the unstressed thickness, holding in the compressed state for 20 minutes, releasing the compression on the sample, and measuring the change in the thickness of the specimen after 24 hours in the uncompressed state. For cyclic testing, materials were cycled to a peak strain in the range of 50-60% at 2 mm/min, held at that strain target for a duration of 15 min, unloaded to the lower strain target (50% strain), held at this strain for 15 min and then brought back to the peak strain condition. This cycle was repeated 50 times for each material and the % recovery for the material was reported after a 24-hour recovery period. Mono-compression testing results for 60% strain compression are presented in Table 16. Mono-compression testing results for 80% strain compression are presented in Table 17. Cyclic compression testing results are presented in Table 18. It was found that higher thermal treatment temperatures are required to maintain resiliency for increasingly severe mechanical compression (80%, cyclic testing).

TABLE 16

| Material ID | Anneal Temperature (° C.) | Treatment ATM | Treatment Duration (min) | Duration of hold at 60% Strain (min) | Compression Set (%) |
|---|---|---|---|---|---|
| S100142 | None | None | None | 20 | 49.6 |
| S100142 | 250 | Air | 30 | 20 | 6.6 |
| S100142 | 275 | Air | 30 | 20 | 6.0 |
| S100142 | 300 | Air | 30 | 20 | 6.9 |
| S100142 | 325 | Air | 30 | 20 | 6.0 |
| S100142 | 350 | Air | 30 | 20 | 7.3 |

TABLE 17

| Material ID | Anneal Temperature (° C.) | Treatment ATM | Treatment Duration (min) | Duration of hold at 80% Strain (min) | Compression Set (%) |
|---|---|---|---|---|---|
| S100142 | None | None | None | 20 | 86.3 |
| S100142 | 250 | Air | 30 | 20 | 74.3 |
| S100142 | 275 | Air | 30 | 20 | 61.8 |
| S100142 | 300 | Air | 30 | 20 | 56.9 |
| S100142 | 325 | Air | 30 | 20 | 54.5 |
| S100142 | 350 | Air | 30 | 20 | 65.1 |

TABLE 18

| Material ID | Anneal Temperature | Treatment Temperature (° C.) | Treatment Duration (min) | Strain Range (%) | Compression Set (%) |
|---|---|---|---|---|---|
| S100142 | 250 C. | 350 C. | 30 | 50-60 | 63.2 |
| S100142 | 275 C. | 350 C. | 30 | 50-60 | 42.8 |
| S100142 | 325 C. | 350 C. | 30 | 50-60 | 27.1 |

Test 13—Effect of MTES Sol Molecular Weight on Compression Set

Silica-based aerogel composites were tested using mono-compression testing. The aerogel composite had a SiC content of 35%, and a hydrophobic content of 36%. The high molecular weight aerogel compositions (High MW) were made by increasing the molecular weight of the MTES sol by way of solids increase during hydrolysis. The molecular weight of the MTES sol was increased in the range of 2× to 3× over the standard molecular weight formulation. High MW aerogel compositions were compared to standard molecular weight formulations (Standard). The silica-based aerogel composites were made under high temperature, high pressure aging conditions (HTHP) at 90° C. Aerogel composites were formed on a Formosa batting (Formosa) or a Canyue batting (Canyue) as a reinforcing material. Formosa aerogel composites had a thickness of 3.2 mm. Canyue aerogel composites had a thickness of 2.5 mm. Samples were annealed at 250° C., 300° C., or 350° C. in air. The samples were tested by compressing the aerogel specimen at a max strain of 60% (Formosa), or a max strain of 50% (Canyue), of the unstressed thickness, holding in the compressed state for 24 hours, releasing the compression on the sample, and measuring the change in the thickness of the specimen in the uncompressed state. Mono-compression testing results for the Formosa sample are presented in Table 19. Mono-compression testing results for the Canyue sample are presented in Table 20. Increased MTES molecular weight improves compression set behavior over the standard MW formulation, most notably following annealing.

TABLE 19

| Material ID | TMES MW | Anneal Temperature (° C.) | Duration of hold at 60% Strain (hours) | Compression Set (%) |
|---|---|---|---|---|
| Formosa | Standard | None | 24 | 86.3 |
| Formosa | High MW | None | 24 | 84.6 |
| Formosa | Standard | 250 C. | 24 | 62.3 |
| Formosa | High MW | 250 C. | 24 | 24.7 |
| Formosa | Standard | 300 C. | 24 | 39.0 |
| Formosa | High MW | 300 C. | 24 | 23.6 |
| Formosa | Standard | 350 C. | 24 | 36.4 |
| Formosa | High MW | 350 C. | 24 | 13.2 |

TABLE 20

| Material ID | TMES MW | Anneal Temperature (° C.) | Duration of hold at 60% Strain (hours) | Compression Set (%) |
|---|---|---|---|---|
| Canyue | Standard | None | 24 | 89.1 |
| Canyue | High MW | None | 24 | 81.1 |
| Canyue | Standard | 250 C. | 24 | 35.3 |
| Canyue | High MW | 250 C. | 24 | 14.3 |

TABLE 20-continued

| Material ID | TMES MW | Anneal Temperature (° C.) | Duration of hold at 60% Strain (hours) | Compression Set (%) |
|---|---|---|---|---|
| Canyue | Standard | 300 C. | 24 | 26.0 |
| Canyue | High MW | 300 C. | 24 | 12.3 |
| Canyue | Standard | 350 C. | 24 | 20.5 |
| Canyue | High MW | 350 C. | 24 | 13.5 |

Test 14—Effect of Density of Reinforced Aerogel on Compression Set

Silica-based aerogel composites were tested using mono-compression testing. The aerogel composite had a hydrophobic content of 36%. The silica density of the aerogel material was either 0.045 g/cc (Aero45R), 0.065 g/cc (Aero65R), or 0.085 g/cc (Aero85R) silica density. Aerogel composites were formed on a melamine foam as a reinforcing material using guanidine as the base during wet-gel formation. The melamine aerogel composites had a thickness of 10 mm. Samples were annealed at 250° C. in air. The samples were tested by compressing the aerogel specimen at a max strain of 80% of the unstressed thickness, holding in the compressed state for 1 minute, releasing the compression on the sample, and measuring the change in the thickness of the specimen in the uncompressed state. Mono-compression testing results for the melamine aerogel composites are presented in Table 21.

TABLE 21

| Material ID | Silica Density | Anneal Temperature | Strain (%) | Compression Set (%) |
|---|---|---|---|---|
| Aero45R | 0.065 g/cc | None | 80 | 86.3 |
| Aero45R | 0.065 g/cc | 250 C. | 80 | 51.3 |
| Aero65R | 0.075 g/cc | None | 80 | 78.8 |
| Aero65R | 0.075 g/cc | 250 C. | 80 | 43.4 |
| Aero85R | 0.085 g/cc | None | 80 | 77.5 |
| Aero85R | 0.085 g/cc | 250 C. | 80 | 31.3 |

Test 15—Effect of Hydrophobic Content of Reinforced Aerogel on Compression Set

Silica-based aerogel composites were tested using mono-compression testing. The aerogel composite had a hydrophobic content of 36% MTES, 50% MTES, 65% MTES, 80% MTES, 100% MTES, or 100% MTMS. "100% MTES" is like the standard formulation but uses 100% instead of 36% MTES. "100% MTMS" is hydrolyzed MTES with oxalic acid instead of the normal phosphoric acid, and the solvent is methanol rather than ethanol. The silica density of the aerogel material was 0.065 g/cc. Aerogel composites were formed on a melamine foam as a reinforcing material using guanidine as the base for MTES and ammonia for the base for MTMS during wet-gel formation. The melamine aerogel composites had a thickness of 10 mm. Samples were annealed at 250° C. in air. The samples were tested by compressing the aerogel specimen at a max strain of 80% of the unstressed thickness, holding in the compressed state for 1 minute, releasing the compression on the sample, and measuring the change in the thickness of the specimen in the uncompressed state. Mono-compression testing results for the melamine aerogel composites are presented in Table 22. Without heat treatment, resiliency of 36-80% MTES is similar and does not improve much until 100% MTES. After heat treatment, there is a trend of improving resiliency as % MTES increases. MTES-derived aerogel may be more resilient than silica because it leads to lower crosslinking density.

It was found that 100% MTES and 100% MTMS have similarly sized large pores compared to the standard formulation, but 100% MTMS is resilient while 100% MTES is not very resilient. Without being bound to any theory, this difference in resilience is probably due to lower crosslinking density in 100% MTMS. The resiliency of 100% MTES can be improved by heat treatment, but it is still not as low as 100% MTMS.

TABLE 22

| Hydrophobe | Anneal Temperature | Strain (%) | Compression Set (%) |
|---|---|---|---|
| 36% MTES | None | 80 | 85.0 |
| 36% MTES | 250 C. | 80 | 76.3 |
| 50% MTES | None | 80 | 86.3 |
| 50% MTES | 250 C. | 80 | 61.3 |
| 65% MTES | None | 80 | 88.8 |
| 65% MTES | 250 C. | 80 | 58.8 |
| 80% MTES | None | 80 | 83.8 |
| 80% MTES | 250 C. | 80 | 46.3 |
| 100% MTES | None | 80 | 51.3 |
| 100% MTES | 250 C. | 80 | 37.5 |
| 100% MTMS | None | 80 | 3.8 |
| 100% MTMS | 250 C. | 80 | 0 |

Test 16—Effect of Hydrophobic Content of Fiberglass Reinforced Aerogel on Compression Set Silica-based aerogel composites were tested using mono-compression testing. The aerogel composite had a hydrophobic content of 36% MTES, 50% MTES, 65% MTES, 80% MTES, 100% MTES, or 100% MTMS. "100% MTES" is like the standard formulation but uses 100% instead of 36% MTES. "100% MTMS" is hydrolyzed MTES with oxalic acid instead of the normal phosphoric acid, and the solvent is methanol rather than ethanol. The silica density of the aerogel material was 0.065 g/cc. Aerogel composites were formed on a fiberglass as a reinforcing material using guanidine as the base for MTES and ammonia for the base for MTMS during wet-gel formation. The melamine aerogel composites had a thickness of 3 mm. Samples were annealed at 350° C. in air. The samples were tested by compressing the aerogel specimen at a max strain of about 56% of the unstressed thickness, holding in the compressed state for 24 hours, releasing the compression on the sample, and measuring the change in the thickness of the specimen in the uncompressed state. Mono-compression testing results for the melamine aerogel composites are presented in Table 23. Cyclic compression of the aerogel composites was also performed. For cyclic testing, materials were cycled to a strain in the range of 50-60% at 2 mm/min, unloaded to the lower strain target (50% strain and then brought back to the peak strain condition. This cycle was repeated 35 times for each material and the % recovery for the material was reported. Cyclic compression testing results for the melamine aerogel composites are presented in Table 24. As was seen in Test 15, without heat treatment, resiliency of 36-80% MTES is similar and does not improve much until 100% MTES.

TABLE 23

| Hydrophobe | Anneal Temperature | Strain (%) | Compression Set (%) |
|---|---|---|---|
| 36% MTES | None | 56 | 94 |
| 36% MTES | 250 C. | 56 | 67 |
| 50% MTES | None | 56 | 92 |
| 50% MTES | 250 C. | 56 | 48 |

TABLE 23-continued

| Hydrophobe | Anneal Temperature | Strain (%) | Compression Set (%) |
|---|---|---|---|
| 65% MTES | None | 56 | 82 |
| 65% MTES | 250 C. | 56 | 16 |
| 80% MTES | None | 56 | 88 |
| 80% MTES | 250 C. | 56 | 27 |
| 100% MTES | None | 56 | 61 |
| 100% MTES | 250 C. | 56 | 53 |

TABLE 24

| Hydrophobe | Anneal Temperature | Strain Range (%) | Compression Set (%) |
|---|---|---|---|
| 36% MTES | None | 50-60 | 31 |
| 36% MTES | 250 C. | 50-60 | 25 |
| 50% MTES | None | 50-60 | DNR |
| 50% MTES | 250 C. | 50-60 | 20 |
| 65% MTES | None | 50-60 | DNR |
| 65% MTES | 250 C. | 50-60 | 7 |
| 80% MTES | None | 50-60 | DNR |
| 80% MTES | 250 C. | 50-60 | 15 |
| 100% MTES | None | 50-60 | 16 |
| 100% MTES | 250 C. | 50-60 | 18 |

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method comprising:
   (a) providing a first aerogel, wherein the first aerogel has a compression set greater than 15% as determined by ASTM D3574-Test D;
   (b) heating the first aerogel under an atmosphere comprising greater than 10% oxygen by volume at a temperature between about 200° C. and 400° C. to obtain a second aerogel; wherein the first aerogel is heated for a time sufficient to alter the compression set of the first aerogel such that the obtained second aerogel has a compression set less than or equal to 15% as determined by ASTM D3574-Test D.

2. The method of claim 1, wherein the atmosphere comprises between about 15% oxygen to about 25% oxygen by volume.

3. The method of claim 1, wherein the atmosphere is air.

4. The method of claim 1, wherein the first aerogel is heated for a time of about 30 seconds or more.

5. The method of claim 1, wherein the first aerogel is heated for a time of between about 30 seconds and about 3 hours.

6. The method of claim 1, wherein during heating of the first aerogel the temperature is limited to a temperature below 400° C.

7. The method of claim 1, wherein the first aerogel comprises silica.

8. The method of claim 1, wherein the first aerogel comprises a base.

9. The method of claim 8, wherein the base is an amine base.

10. The method of claim 8, wherein the first aerogel comprises at least 0.5% of the base by weight.

11. The method of claim 8, wherein the first aerogel comprises between 0.5% to about 10% of the base by weight.

12. The method of claim 8, wherein an amount of base in the first aerogel is greater than an amount of base in the second aerogel.

13. The method of claim 1, wherein the first aerogel is an aerogel composite comprising a reinforcement material.

14. The method of claim 13, wherein the reinforcement material is a fiber reinforcement material.

15. The method of claim 1, wherein the first aerogel is an aerogel composite comprising an opacifying additive.

16. The method of claim 15, wherein the opacifying additive is selected from the group consisting of $B_4C$, Diatomite, Manganese ferrite, MnO, NiO, SnO, $Ag_2O$, $Bi_2O_3$, TiC, WC, carbon black, titanium oxide, iron titanium oxide, zirconium silicate, zirconium oxide, iron (I) oxide, iron (III) oxide, manganese dioxide, iron titanium oxide (ilmenite), chromium oxide, or mixtures thereof.

17. The method of claim 15, wherein the opacifying additive comprises silicon carbide.

18. The method of claim 1, further comprising producing the first aerogel by the process comprising:
   forming a wet gel material;
   aging the wet gel material in a vessel by heating the wet gel material with an aging fluid at an aging temperature and an aging pressure, wherein the aging temperature is above a normal boiling point of the aging fluid, wherein aging pressure of the vessel is maintained above a vapor pressure of the aging fluid during heating; and
   extracting the aging fluid from the heated wet-gel material to form the first aerogel.

* * * * *